US012568326B2

(12) United States Patent
Borra et al.

(10) Patent No.: US 12,568,326 B2
(45) Date of Patent: Mar. 3, 2026

(54) MECHANISM FOR EXTERNAL MULTI-FUNCTIONAL CABLE RETENTION FOR A HEARING DEVICE

(71) Applicant: Starkey Laboratories, Inc., Eden Prairie, MN (US)

(72) Inventors: Ganesh Borra, Plymouth, MN (US); Ryan Owens, Hopkins, MN (US); Joshua Elliot Braband, Eden Prairie, MN (US); Ezdeen Elghannai, Eden Prairie, MN (US); Babak Talebanpour, Plymouth, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 170 days.

(21) Appl. No.: 18/345,814

(22) Filed: Jun. 30, 2023

(65) Prior Publication Data

US 2023/0353922 A1 Nov. 2, 2023

Related U.S. Application Data

(63) Continuation of application No. PCT/US2021/065377, filed on Dec. 28, 2021.

(Continued)

(51) Int. Cl.
*H04R 1/10* (2006.01)
*H04R 25/00* (2006.01)

(52) U.S. Cl.
CPC ........... *H04R 1/1033* (2013.01); *H04R 25/60* (2013.01); *H04R 2225/57* (2019.05)

(58) Field of Classification Search
CPC ... H04R 1/1033; H04R 25/60; H04R 2225/57
See application file for complete search history.

(56) References Cited

U.S. PATENT DOCUMENTS 5,721,783 A 2/1998 Anderson
6,068,506 A * 5/2000 Shen .................... H01R 13/562 439/447

(Continued)

FOREIGN PATENT DOCUMENTS

EP 2597731 A1 5/2013
EP 2680613 B1 2/2018

OTHER PUBLICATIONS

Communication pursuant to Article 94(3) EPC from counterpart European Application No. 21848096.0 dated Dec. 23, 2024, 4 pp.

(Continued)

*Primary Examiner* — Andrew Sniezek
(74) *Attorney, Agent, or Firm* — Shumaker & Sieffert, P.A.

(57) ABSTRACT

A hearing device configured to be worn in an ear of a wearer includes a first housing component defining a recess, a second housing component configured to attach to the first housing component to define an enclosure, and a conductor, and a multi-function cable. The multi-function cable includes a blunt feature and an outer jacket of a multi-function cable. The outer jacket extends through the first housing component. A passage is defined by the blunt feature and the outer jacket, and the conductor extends through the passage. The hearing device further includes a plurality of fibers secured to an inner surface of the passage and an inner surface of the enclosure. The fibers extend through the passage and are configured to transfer mechanical forces from the multi-function cable to the first housing component.

15 Claims, 7 Drawing Sheets

Related U.S. Application Data

(60) Provisional application No. 63/133,665, filed on Jan. 4, 2021.

(56) References Cited

U.S. PATENT DOCUMENTS

| | | | | |
|---|---|---|---|---|
| 7,446,720 | B2 | 11/2008 | Victorian et al. | |
| 8,638,965 | B2 * | 1/2014 | Higgins | H01R 13/22 381/381 |
| 8,792,663 | B2 * | 7/2014 | Cano | H04R 1/1016 381/328 |
| 9,722,318 | B2 | 8/2017 | Adriazola et al. | |
| 10,687,156 | B2 | 6/2020 | Polinske et al. | |
| 11,496,843 | B2 | 11/2022 | Kvist et al. | |
| 2009/0032282 | A1 | 2/2009 | Sedor et al. | |
| 2009/0092269 | A1 | 4/2009 | Nielsen et al. | |
| 2010/0020994 | A1 | 1/2010 | Christensen et al. | |
| 2017/0238104 | A1 | 8/2017 | Sanecki et al. | |
| 2019/0306606 | A1 * | 10/2019 | Varanda | H04R 1/1033 |

OTHER PUBLICATIONS

"IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", IEEE, Dec. 28, 2012, p. 628.

International Preliminary Report on Patentability from International Application No. PCT/US2021/065377 dated Jul. 13, 2023, 18 pp.

International Search Report and Written Opinion of International Application No. PCT/US2021/065377 dated Apr. 25, 2022, 22 pp.

Sanborn et al., "Tensile Properties of Dyneema SK76 Single Fibers at Multiple Loading Rates Using a Direct Gripping Method", Journal of Dynamic Behavior of Materials, vol. 1, No. 1, Dec. 24, 2014, p. 11.

* cited by examiner

MECHANISM FOR EXTERNAL MULTI-FUNCTIONAL CABLE RETENTION FOR A HEARING DEVICE

This application is a continuation of International Application No. PCT/US2021/065377, filed on Dec. 28, 2021, which claims priority to U.S. Provisional Patent Application 63/133,665, filed Jan. 4, 2021, the entire content of both of which are incorporated herein by reference.

TECHNICAL FIELD

This disclosure relates to ear-worn electronic hearing devices.

BACKGROUND

Hearing devices provide auditory stimuli to wearers. Some examples of hearing devices include headsets, hearing aids, speakers, cochlear implants, bone conduction devices, and personal listening devices. Hearing aids provide amplification to compensate for hearing loss by transmitting amplified sounds to a wearer's ear drums. Hearing devices may be capable of performing wireless communication with other devices, such as receiving streaming audio from a streaming device via a wireless link. Wireless communication may also be performed for programming the hearing device and transmitting information from the hearing device. For performing such wireless communication, hearing devices can include a wireless transceiver and an antenna.

SUMMARY

Advancements in hearing device technology have resulted in a reduction in the overall size of hearing devices and/or the available internal space due to the desire to incorporate a greater number of components that provide for a greater array of capabilities. Those space constraints and/or 2.4 GHz antenna functionality predicate that some or all of a conductor (e.g., an antenna) and/or electronic components (e.g., sensors) to be located outside of the ear/hearing device, therefore exposing those components to different types of mechanical loading during normal customer usage.

For example, a wearer attempting to remove a hearing device from the ear canal may pull a multi-function cable of the hearing device. During this process, the wearer may apply (e.g., via the multi-function cable) tensile and rotational forces to the hearing device, subjecting one or more components of the hearing device to mechanical forces that lead to mechanical failure. For example, if a conductor (e.g., an antenna, a conductor for power or signals of electronic components, etc.) of the hearing device are integrated (e.g., embedded) into the multi-function cable, pulling the multi-function cable of the hearing device may subject the conductor, as well as other fragile components of the hearing device, to mechanical forces, increasing the likelihood of the hearing device breaking.

Among other techniques, this disclosure describes techniques for transferring mechanical forces from more fragile components of a hearing device, such as the conductor to more durable components of the hearing device, such as a housing component (e.g., a faceplate and/or a shell) of the hearing device. The housing components of the hearing device may define a cavity containing various internal components of the hearing device.

In one example, a hearing device configured to be worn in an ear of a wearer, the hearing device comprising: a first housing component; a second housing component configured to attach to the first housing component to define an enclosure for containing a plurality of hearing device components; a conductor; a multi-function cable comprising: a blunt feature, and an outer jacket of a multi-function cable, wherein: the outer jacket of the multi-function cable extends through the first housing component; a passage is defined by the blunt feature and the outer jacket; the conductor extends through the passage; and the blunt feature is integrated into the outer jacket and is configured to mechanically interface with a recess defined by the first housing component to prevent rotation of the blunt feature within the recess; and a plurality of fibers, secured to an inner surface of the passage and an inner surface of the enclosure, wherein: the plurality of fibers extends through the passage defined by the blunt feature and the outer jacket of the multi-function cable; and the plurality of fibers is configured to transfer mechanical forces from the multi-function cable to the first housing component.

In another example, a method of assembling a hearing device configured to be worn in an ear of a wearer, the method comprising: extending a conductor through a passage defined by a blunt feature and an outer jacket of a multi-function cable; inserting a blunt feature, integrated into the outer jacket, into a recess on a housing component of the hearing device, wherein the blunt feature is configured to mechanically interface with the recess of the housing component to prevent rotation of the blunt within the recess; extending a plurality of fibers through the passage; and securing the plurality of fibers to an inner surface of the passage, wherein the plurality of fibers is configured to transfer mechanical forces from the multi-function cable to the plurality of fibers.

In another example, this disclosure describes a hearing device configured to be worn in an ear of a wearer, the hearing device comprising: a housing component; a multi-function cable having an outer jacket that extends through the housing component; and an electronic component connected to the multi-function cable.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

Figure 1:
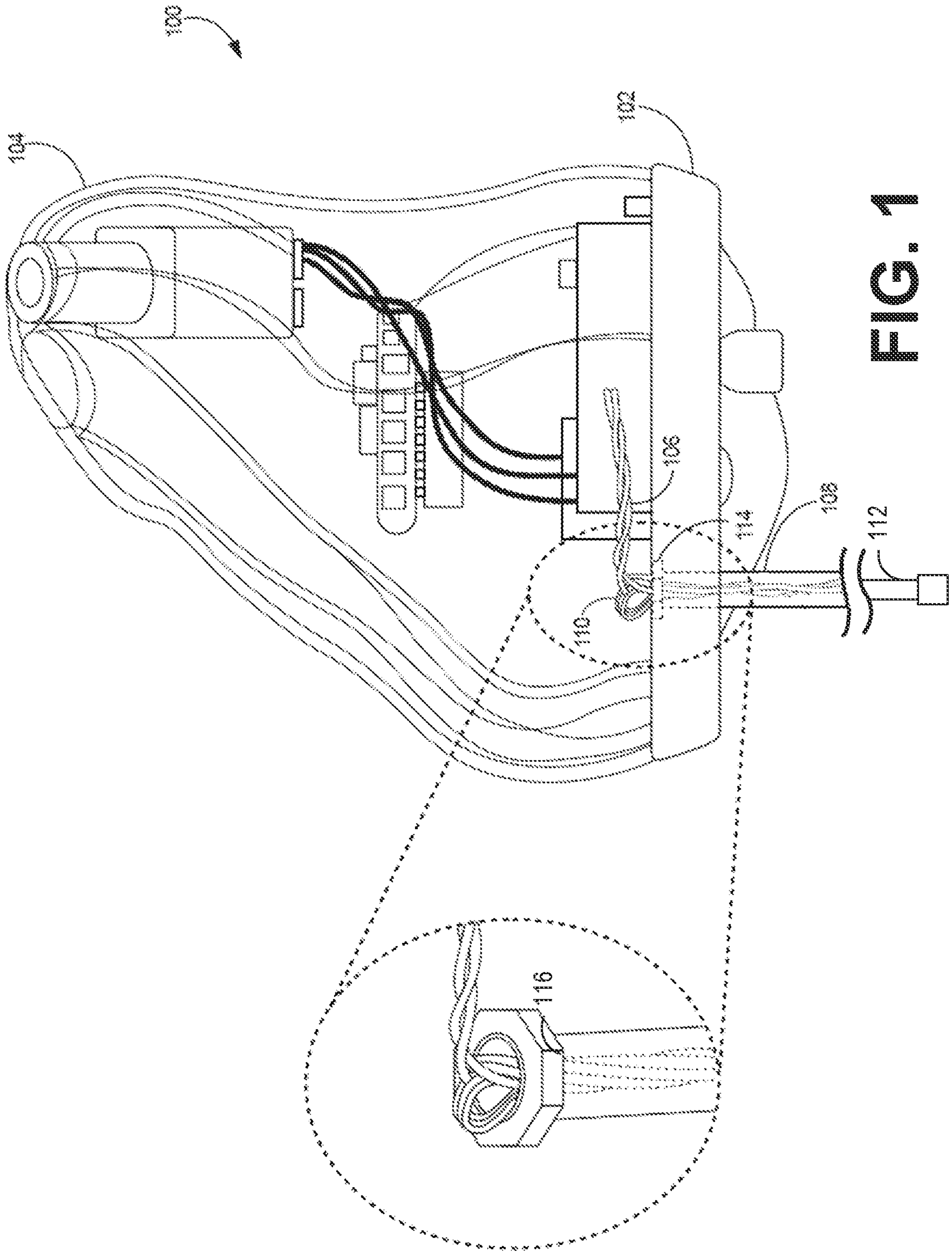
FIG. 1 is a conceptual diagram illustrating various components of an example hearing device in accordance with one or more aspects of this disclosure.

FIG. 1 is a conceptual diagram illustrating various components of an example hearing device in accordance with one or more aspects of this disclosure. As shown in the example of FIG. 1, a hearing device 100 may include a faceplate 102, a shell 104, a conductor 106, a multi-function cable 108, and a plurality of fibers 110. Faceplate 102 and shell 104 are two different housing components of hearing device 100. Thus, faceplate 102 and shell 104 may be first and second housing components, or vice versa.

In the example of FIG. 1, hearing device 100 is an in-the-ear hearing aid. However, hearing device 100 may be any ear-worn electronic hearing device, such as hearables (e.g., wearable earphones, ear monitors, earbuds, etc.), hearing aids, hearing instruments, and hearing assistance devices.

In the example of FIG. 1, hearing device 100 includes faceplate 102 and shell 104, which may be attached to one another to define an enclosure within which internal components of hearing device 100 are disposed. The internal components of hearing device 100 may include one or more processors (e.g., microprocessors, integrated circuits, field programmable gate arrays, digital signal processors (DSPs), etc.), memory circuitry, power management circuitry, one or more communication devices (e.g., a radio, a near-field magnetic induction (NFMI) device), one or more antennas, one or more microphones, receivers/speakers, bone conduction transceivers, sensors, switches and the like.

Hearing device 100 may incorporate a long-range communication device, such as a Bluetooth® transceiver or other type of radio frequency (RF) transceiver. A communication device (e.g., a radio or NFMI device) of hearing device 100 may be configured to facilitate communication between a left ear device and a right ear device of hearing device 100.

Hearing device 100 may incorporate conductor 106. In examples where conductor 106 is an antenna, conductor 106 may be coupled to a high-frequency transceiver, such as a 2.4 GHz radio. For example, the RF transceiver may conform to an IEEE 802.11 (e.g., WiFi®) or Bluetooth® (e.g., BLE, Bluetooth® 4.2 or 5.0) specification. However, hearing device 100 may employ other transceivers or radios, such as a 900 MHz radio. In some examples, conductor 106 may conduct power to electronic components, such as one or more sensors. In some examples, conductor 106 may conduct signals to or from the electronic components. In some examples, there may be multiple conductors, one of which may be an antenna and one or more for conducting power or data to electronic components.

In examples where conductor 106 is an antenna, hearing device 100 may be configured to receive data, such as streaming audio (e.g., digital audio data or files) from an electronic or digital source, via the antenna. Example electronic/digital sources (e.g., accessory devices) include an assistive listening system, a TV streamer, a radio, a smartphone, a laptop, a cell phone/entertainment device (CPED) or other electronic device that serves as a source of digital audio data or other types of data files.

Hearing device 100 may be configured to effect bi-directional communication (e.g., wireless communication) of data with an external source via the antenna, such as a remote server via the Internet or other communication infrastructure. For example, hearing device 100 may include a left ear device and a right ear device configured to implement ear-to-ear communication between the left and right ear devices, thereby effecting bi-directional communication (e.g., wireless communication) therebetween.

Hearing device 100 may include a wide variety of ear-level electronic devices that aid a wearer with impaired hearing. Hearing device 100 may also include a wide variety of devices that produce processed sound for wearers with normal hearing. For example, hearing device 100 may include hearables (e.g., wearable earphones, headphones, earbuds, virtual reality headsets), hearing aids (e.g., hearing instruments), bone-conduction devices, and the like. Hearing device 100 may include, but are not limited to in-the-ear (ITE), in-the-canal (ITC), invisible-in-canal (IIC), receiver-in-canal (RIC), receiver-in-the-ear (RITE) or completely-in-the-canal (CIC) type hearing devices or some combination of the above. Hearing device 100 may include systems including a single left ear device, a single right ear device, or a combination of a left ear device and a right ear device.

Faceplate 102 may be a surface to which internal components of hearing device 100 are secured. For example, a processor, memory circuitry, power management circuitry, one or more communication devices, one or more antennas, one or more microphones, and a receiver/speaker, and the like may be secured to faceplate 102. In general, when a wearer wears hearing device 100, faceplate 102 faces outward from the midline of the wearer. In other words, faceplate 102 faces outward from the ear canal of the wearer.

Hearing device may include a shell 104 configured to attach to faceplate 102 to define an enclosure in which internal components of hearing device 100 are disposed. Shell 104 may be molded into a shape that can be worn in an ear of a wearer. For instance, shell 104 may be molded into a shape suitable (e.g., to fit the unique anatomy of a wearer's ear and/or ear canal) for insertion into an ear canal of a wearer. Shell 104 may be made of a flexible material or an elastomer, such as silicone rubber or other flexible material. Shell 104 may have different shapes and styles than that shown in the example of FIG. 1. For example, hearing device 100 may be an in-the-ear device and shell 104 may be molded for wear outside an ear canal of a wearer. In other examples, the shape of shell 104 is not specific to the wearer.

While a portion of conductor 106 may be within the enclosure defined by faceplate 102 and shell 104, the remaining portion of conductor 106 may protrude from the enclosure. The portion of conductor 106 protruding from the enclosure may be integrated into multi-function cable 108 (e.g., a pull-out handle, a pull-out string, etc.). For example, conductor 106 may be embedded within multi-function cable 108. Conductor 106, and thus also multi-function cable 108, may be secured to a component of hearing device (e.g., faceplate 102, shell 104, etc.).

Multi-function cable 108 may aid the wearer in removing hearing device 100. For example, the wearer may pull multi-function cable 108 to remove hearing device 100 from the ear canal. Multi-function cable 108 may be formed to abut part of the concha at the antitragus when hearing device 100 is positioned in or at the ear canal. This configuration may help retention of hearing device 100 in the ear canal while the wearer is moving and/or if the shape of the ear canal is changing (e.g. while the wearer is chewing, yawning, etc.). In some examples, multi-function cable 108 may include an electrically non-conductive material, such as plastic or nylon.

Advancements in hearing device technology have resulted in a reduction in the overall size of hearing devices and/or the available internal space due to the desire to incorporate a greater number of components that provide for a greater array of capabilities. Those space constraints and/or 2.4 GHz antenna functionality may predicate that some or all of a conductor (e.g., an antenna) and/or electronic components (e.g., sensors, switches, etc.) to be located outside of the ear/hearing device therefore, making those components exposed to different types of mechanical loading during normal customer usage. As a result, one or more components (e.g., the conductor) of the hearing devices may be more liable to experience mechanical failure, frustrating wearers of the hearing devices.

For example, a wearer attempting to remove a hearing device from the ear canal may pull a multi-function cable of the hearing device. During this process, the wearer may apply (e.g., via the multi-function cable) mechanical forces such as tensile and rotational forces to the hearing device, subjecting one or more components of the hearing device to mechanical forces that lead to mechanical failure. For example, if a conductor (e.g., an antenna) and/or electronic components (e.g., sensors) of the hearing device is integrated (e.g., embedded) into or otherwise associated with the multi-function cable, pulling the multi-function cable of the hearing device may subject the conductor and/or electronic components, as well as other fragile components of the hearing device, to mechanical forces, increasing the likelihood of those components of the hearing device breaking.

In accordance with aspects of this disclosure, hearing device 100 may transfer mechanical forces that may otherwise be applied to more fragile components of hearing device 100, such as conductor 106, to more durable components of hearing device 100, such as faceplate 102 and/or shell 104 of hearing device 100. Configuring hearing device 100 in this way may improve the durability of hearing device 100 by distributing at least some of the mechanical forces applied by an external force (e.g., a user of hearing device 100) across the larger surface areas of at least one of faceplate 102 or shell 104. As a result, techniques of this disclosure may protect conductor 106 and/or electronic components integrated within the multi-function cable 108 from these mechanical forces, reducing the likelihood of the more fragile components of hearing device 100 (e.g., conductor 106, electronic components within and/or associated with multi-function cable 108, etc.) from experiencing mechanical failure.

Multi-function cable 108 of hearing device 100 may include an outer jacket 112. Outer jacket 112 may protect conductor 106 by covering (e.g., enveloping) conductor 106. Outer jacket 112 may extend through a housing component, such as faceplate 102 or shell 104. Outer jacket 112 may include a thermoplastic elastomer and may be resistant to ultraviolent radiation and may have a lower durometer rating for increased user comfort.

Multi-function cable 108 may further include a blunt feature 114. Blunt feature 114 may be integrated into outer jacket 112. For instance, blunt feature 114 may be molded-in to outer jacket 112, outer jacket 112 may be postprocessed to form blunt feature 114, or blunt feature 114 may otherwise be integrated with outer jacket 112. Blunt feature 114 may be embedded into an end of outer jacket 112 extending through the housing component (e.g., faceplate 102, shell 104, etc.). Blunt feature 114 may define, in conjunction with outer jacket 112, a passage 116 through which conductor 106 and other components of hearing device 100 extend. A face of blunt feature 114 may be substantially polygonal. Further, the face of blunt feature 114 and/or the shape of blunt feature 114 in general may not be blunt. For example, the end of blunt feature 114 may have well-defined edges. In other examples, one or more edges of blunt feature 114 may have blunted edges. In yet other examples, blunt feature 114 may be a plug configured to mechanically interface with a recess or components defined by the housing component (e.g., faceplate 102 or shell 104). Blunt feature 114 may, at least in part, help retain the shape of conductor 106. In the example of FIG. 1, the recess is defined by faceplate 102 and many examples in this disclosure describe the recess as being defined by faceplate 102. However, such examples may be applicable to other housing components of hearing instrument 100, such as shell 104.

Blunt feature 114, particularly the end of blunt feature 114, may be configured to mechanically interface with a recess defined by faceplate 102 to transfer mechanical forces (e.g., rotational force, linear force, etc.) applied to multi-function cable 108 to faceplate 102. The recess of faceplate 102 may be similar in geometry (e.g., substantially polygonal) to the face of blunt feature 114 so that blunt feature 114 may be fixedly inserted into the recess of faceplate 102. In this way, blunt feature 114 may transfer mechanical forces from multi-function cable 108 to faceplate 102 to prevent rotation of blunt feature 114, and to some extent multi-function cable 108, within the recess of faceplate 102. In some examples, blunt feature 114 may be, at least in part, secured to the recess of faceplate 102 by using an adhesive, a fastener, or the like. In some examples, the recess defined by faceplate 102 may be defined by one or more protrusions that extend inward from an inner surface of faceplate 102 toward a center of the cavity defined by faceplate 102 and shell 104. In other examples, the recess defined by faceplate 102 may be formed as an area sunk within faceplate 102 toward an outer edge of faceplate 102.

Similarly, shell 104 may define a recess such that blunt feature 114 may mechanically interface with the recess of shell 104 to transfer mechanical forces to shell 104. Like with faceplate 102, in some examples, the recess defined by shell 104 may be defined by one or more protrusions that extend inward from an inner surface of shell 104 toward a center of the cavity defined by faceplate 102 and shell 104. In other examples, the recess defined by shell 104 may be formed as an area sunk within shell 104 toward an outer edge of shell 104. Thus, the recess may be sunken into an inner surface of a housing component, such as faceplate 102 or shell 104.

Hearing device 100 may include a plurality of fibers 110 configured to transfer mechanical forces (e.g., tensile force). Fibers 110 may include or be included in a material with a tensile modulus of elasticity of about 65 to 115 gigapascals (GPa). For example, fibers 110 may include Aramid fibers, such as Kevlar®. However, it should be understood that fibers other than Aramid fibers are contemplated by this disclosure. Fibers 110 may, at least in part, help retain the shape of conductor 106.

Fibers 110 may be secured (e.g., by using an adhesive, fastener, etc.) to an inner surface of passage 116 defined by outer jacket 112 and blunt feature 114 to transfer mechanical forces from multi-function cable 108. Fibers 110 may also be secured (e.g., by using an adhesive, fastener, etc.) to an inner surface of the enclosure defined by faceplate 102 and shell 104 to transfer mechanical forces to at least one of faceplate 102 or shell 104. As such, fibers 110 may transfer mechanical forces from more fragile components of hearing device 100 to more durable components of hearing device 100. Moreover, fibers 110 may transfer mechanical forces without experiencing mechanical failure because of the relatively high tensile modulus of elasticity of fibers 110.

Thus, by configuring hearing device 100 to include blunt feature 114 and fibers 110 in accordance with one or more aspects of this disclosure, hearing device 100 may transfer mechanical forces that would otherwise be applied to more fragile components of hearing device 100. For example, blunt feature 114 may transfer rotational force from multi-function cable 108 to faceplate 102, and fibers 110 may transfer tensile force to at least one housing component, such as faceplate 102 or shell 104, reducing the likelihood of the more fragile components of hearing device 100 (e.g., conductor 106 within and/or associated with multi-function cable 108, outer jacket 112, etc.) from experiencing mechanical failure.

Figure 2:
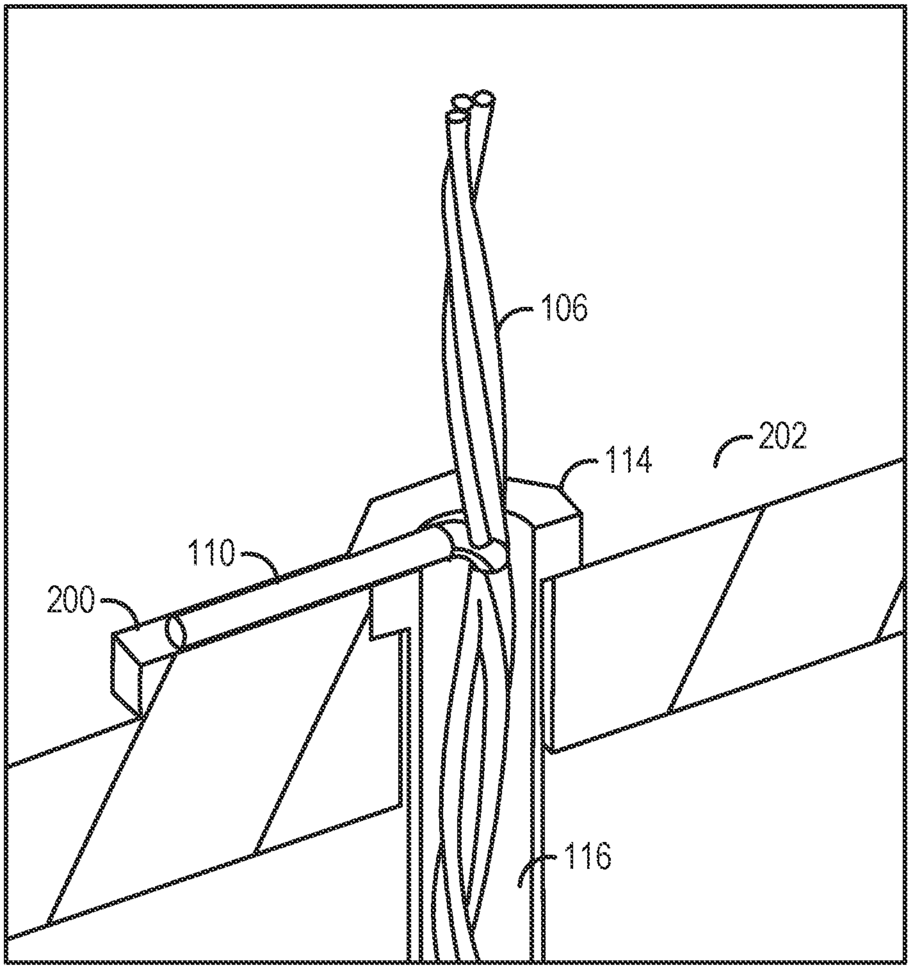
FIG. 2 is a conceptual diagram illustrating in greater detail an example hearing device with a structure configured to secure a blunt feature in accordance with one or more aspects of this disclosure.

FIG. 2 is a conceptual diagram illustrating in greater detail an example hearing device with a structure 200 configured to secure a blunt feature 114 in accordance with one or more aspects of this disclosure. In the example of FIG. 2, structure 200 protrudes from an inner surface of a housing component 202, such as faceplate 102 or shell 104. Structure 200 may be configured to abut blunt feature 114 on one or more sides of blunt feature 114 and, in this way, prevent rotation of blunt feature 114. One or more fibers 110 may be attached to structure 200. Thus, in the example of FIG. 2, component 202 may act as at least a partial substitute for a recess defined by the housing component. In other examples, housing component 202 may include one or more additional structures like structure 200 to further define a recess and prevent rotational motion of blunt feature 114.

Figure 3:
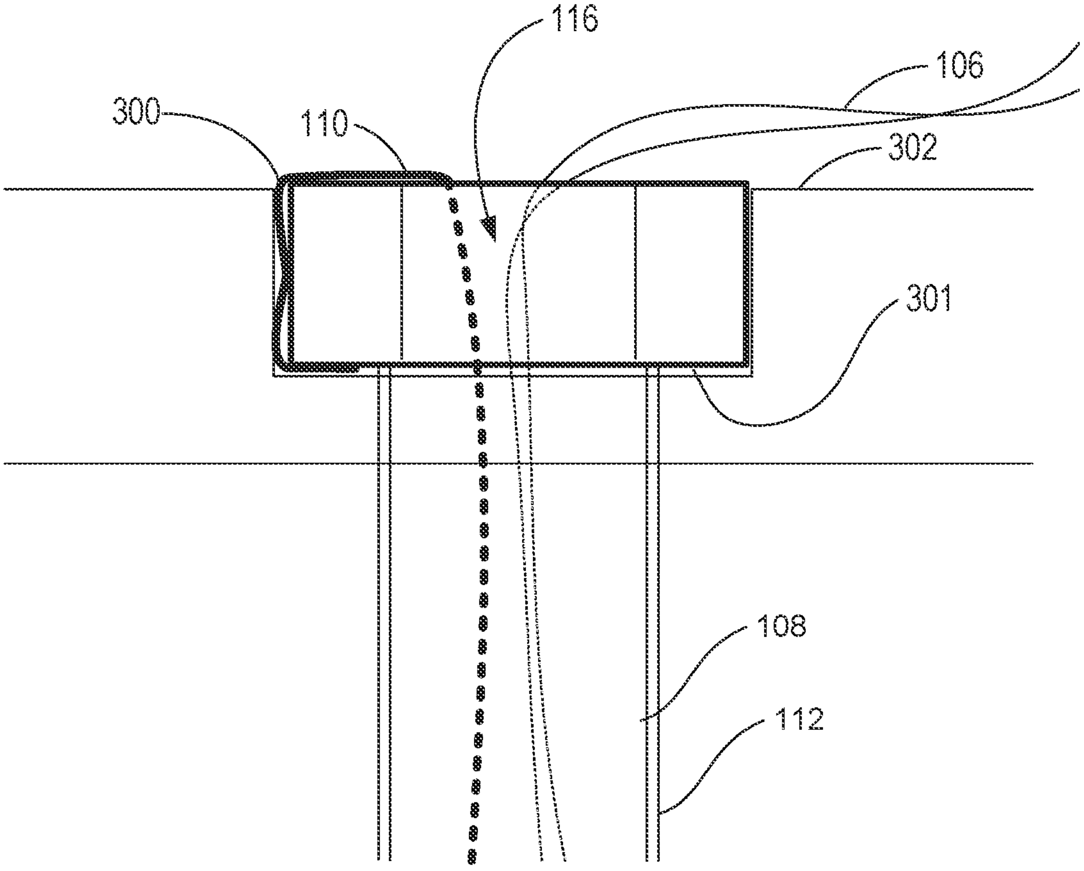
FIG. 3 is a conceptual diagram illustrating in greater detail an example hearing device with a conductor incorporating a plurality of fibers that fold into a compartment in accordance with one or more aspects of this disclosure.

FIG. 3 is a conceptual diagram illustrating in greater detail an example hearing device with a conductor incorporating a plurality of fibers 110 that fold into a compartment 300 in accordance with one or more aspects of this disclosure. As shown in the example of FIG. 3, hearing device 100 defines a compartment 300 between blunt feature 114 and a wall of a recess 301 of a housing component 302, such as faceplate 102 or shell 104.

As described above, fibers 110 may be secured to an inner surface of passage 116 defined by outer jacket 112 and blunt feature 114 to transfer mechanical forces that would otherwise be applied to conductor 106 to housing component 302. In some examples, the contact area between fibers 110 and housing component 302 may be increased to improve the transfer of mechanical forces. For example, fibers 110 may be splayed across a surface of housing component 302 to increase a contact area between the plurality of fibers and the surface of housing component 302. Fibers 110 may be secured to the surface of housing component 302 using an adhesive, fastener, and the like. In other examples, such as the example of FIG. 3, fibers 110 may be configured to fold into compartment 300 between blunt feature 114 and a wall of the recess of housing component 302, in this way distributing at least some of the mechanical forces applied by an external force (e.g., a user of hearing device 100) across the larger surface areas (e.g., the surface area of the wall of the recess) of housing component 302).

Figure 4:
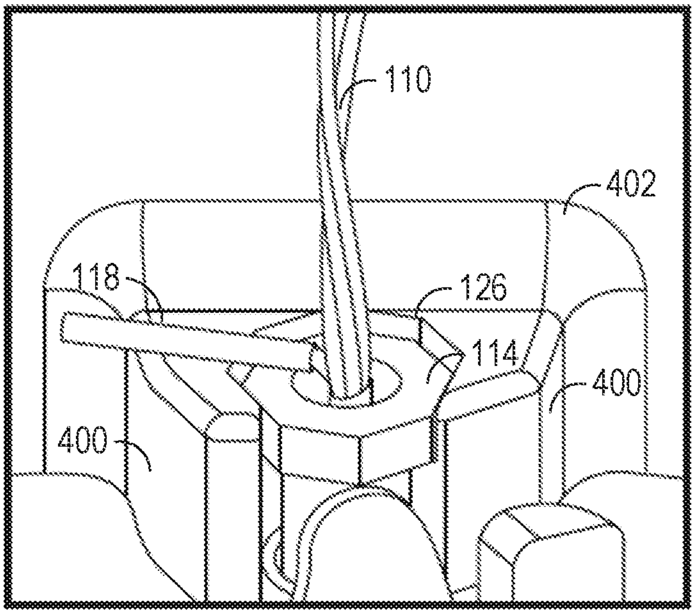
FIG. 4 is a conceptual diagram illustrating one or more example protrusions from a housing component where the protrusions are configured to resist rotational motion of the blunt feature.

FIG. 4 is a conceptual diagram illustrating one or more example protrusions 400 from a housing component 402, where protrusions 400 are configured to resist rotational motion of blunt feature 114. As shown in the example of FIG. 4, one or more protrusions 400 may extend inward from an inner surface of housing component 402 toward a center of the cavity defined by housing component 402 and one or more other housing components, such as faceplate 102 and/or shell 104. Thus, protrusions 400 that extend inward from an inner surface of housing component 402 may define a recess 126 that receives blunt feature 114. Recess 126 may be shaped so as to resist rotational motion of blunt feature 114.

In the example of FIG. 4, recess 126 may be similar in geometry (e.g., substantially polygonal) to the face of blunt feature 114 so that blunt feature 114 may be fixedly inserted into recess 126. In this way, blunt feature 114 may transfer mechanical forces that would otherwise be applied to multi-function cable 108 to faceplate 102. In other examples, the geometry of recess 126 may differ from a geometry of blunt feature 114 so long as the geometry of recess 126 is sufficient to resist rotation of blunt feature 114.

Figure 5:
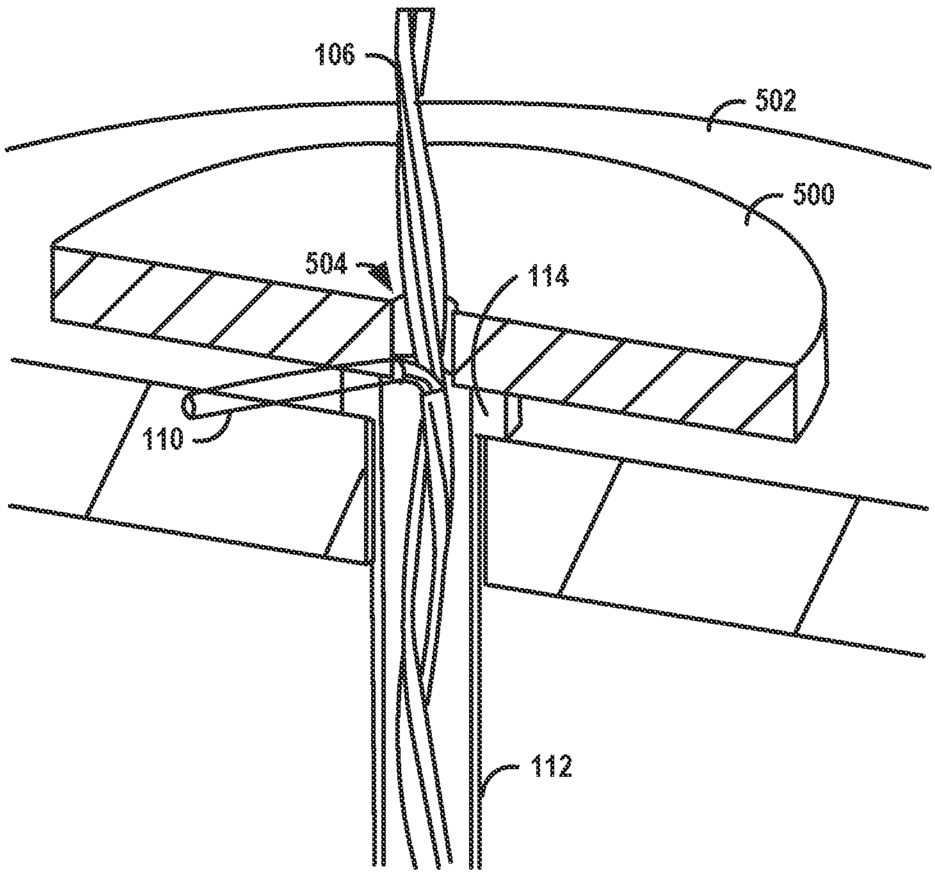
FIG. 5 is a conceptual diagram illustrating an example compression element configured to secure a blunt feature in accordance with one or more aspects of this disclosure.

FIG. 5 is a conceptual diagram illustrating an example compression element 500 configured to secure a blunt feature 114 in accordance with one or more aspects of this disclosure. In some examples, hearing device 100 may include a compression element 500 configured to compress blunt feature 114 into a housing component 502, such as faceplate 102 or shell 104. In other words, blunt feature 114 may be sandwiched between compression element 500 and an inner surface of housing component 502 such that friction resists linear and rotational motion of blunt feature 114.

Compression element 500 may define an opening 504 to a passage through which conductor 106 and fibers 110 may pass. Opening 504 may be sufficiently narrow that, when fibers 110 and conductor 106 are within opening 504, friction resists removal of fibers 110 and/or conductor 106 from opening 504. In the example of FIG. 5, fibers 110 may be compressed between compression element 504 and housing component 502. Compression element 500 may be glued or otherwise affixed to the surface of housing component 502.

Figure 6:
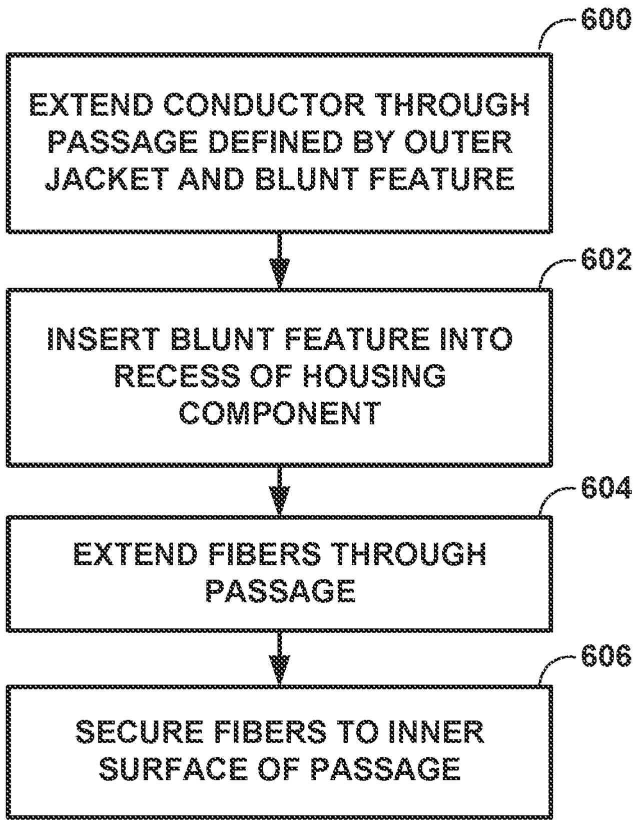
FIG. 6 is a flowchart illustrating an example method of assembling a hearing device in accordance with one or more aspects of this disclosure.

FIG. 6 is a flowchart illustrating an example method of assembling hearing device 100 in accordance with one or more aspects of this disclosure. In the example of FIG. 6, hearing device 100 may be assembled to transfer mechanical forces that would otherwise be applied to more fragile components of a hearing device, such as a conductor (e.g., an antenna), to more durable components of the hearing device, such as faceplate 102 and/or shell 104 of hearing device 100. Although described with respect to hearing device 100, methods similar to those of FIG. 6 may be applied to any hearing device, or any combination of hearing devices, described herein.

As shown in the example of FIG. 6, hearing device 100 may be assembled by extending conductor 106 through passage 116 defined by outer jacket 112 and blunt feature 114 of multi-function cable 108 (600). In examples where conductor 106 is an antenna, conductor 106 may be coupled to a high-frequency transceiver, such as a 2.4 GHz radio. For example, the RF transceiver may conform to an IEEE 802.11 (e.g., WiFi®) or Bluetooth® (e.g., BLE, Bluetooth® 4.2 or 5.0) specification. However, hearing device 100 may employ other transceivers or radios, such as a 900 MHz radio. In some examples, conductor 106 may include one or more wires, optical fibers, printed conducting traces, or other components for conducting power and/or data.

Furthermore, in examples where conductor 106 is an antenna, conductor 106 may be configured to perform radio frequency (RF) communication. In some examples, conductor 106 may conduct signals (e.g., electrical signals, optical signals, etc.) from one or more electronic components, such as sensors, included in or attached to multi-function cable 108. While a portion of conductor 106 may be within the enclosure defined by faceplate 102 and shell 104, the remaining portion of conductor 106 may protrude from the enclosure. Conductor 106 may be integrated into multi-function cable 108 (e.g., a pull-out handle, a pull-out string, etc.). For example, conductor 106 may be embedded within multi-function cable 108. Conductor 106, and thus also multi-function cable 108, may be secured to a housing component of hearing device (e.g., faceplate 102, shell 104, etc.).

Blunt feature 114 of multi-function cable 108 may be inserted into a recess on the housing component of hearing device 100 (602). In other examples, blunt feature 114 may be positioned to abut a component (e.g., component 200) of the housing component that prevents rotation of blunt feature 114. Blunt feature 114 may be integrated into outer jacket 112. For example, blunt feature 114 may be embedded into an end of outer jacket 112 extending through the housing component. Blunt feature 114 may define, in conjunction with outer jacket 112, passage 116 through which conductor 106 and other components (e.g., fibers 110) of hearing device 100 extend. A face of blunt feature 114 may be substantially polygonal.

Blunt feature 114, particularly an end of blunt feature 114, may be configured to mechanically interface with a recess defined by the housing component to transfer mechanical forces (e.g., rotational force) to the housing component. The recess may be defined by protrusions (e.g., protrusions 124) extending inward from an inner surface of the housing component. In other examples, the recess may be a sunken portion of housing component extending outward from a cavity defined by the housing component and one or more other housing components (e.g., faceplate 102 and shell 104). The recess of the housing component may be similar in geometry (e.g., substantially polygonal) to the end of blunt feature 114 so that blunt feature 114 may be fixedly inserted into the recess of housing component. In this way, blunt feature 114 may transfer mechanical forces from multi-function cable 108 to faceplate 102 to prevent rotation of blunt feature 114, and to some extent multi-function cable 108, within the recess of the housing component. In some examples, blunt feature 114 may be, at least in part, secured to the recess of the housing component by using an adhesive, a fastener, and the like.

Fibers 110 may be extended through passage 116 defined by outer jacket 112 and blunt feature 114 (604). Fibers 110 may be configured to transfer mechanical forces (e.g., tensile force) applied to multi-function cable 108 to the housing component. Fibers 110 may include or be included in a material with a relatively high tensile modulus of elasticity (e.g., a tensile modulus of elasticity of about 65 to 115 GPa). For example, fibers 110 may include Aramid fibers, such as Kevlar®. However, it should be understood that fibers other than Aramid fibers are contemplated by this disclosure. Fibers 110 may be outside of, inside of, or interwoven with conductor 106. In some examples, fibers 110 may be splayed across a surface of the housing component. Fibers may be secured to the surface of the housing component using an adhesive, fastener, and the like. In other examples, fibers 110 may be configured to fold into compartment 300 between blunt feature 114 and a wall of the recess of the housing component.

Fibers 110 may be secured (e.g., by using an adhesive, fastener, etc.) to an inner surface of passage 116 defined by outer jacket 112 and blunt feature 114 and to at least one of housing component (e.g., faceplate 102 or shell 104) (606). In this way, fibers 110 may be configured to transfer mechanical forces that may otherwise be applied to more fragile components (e.g., conductor 106) of hearing device 100 to more durable components (e.g., faceplate 102, shell 104, etc.) of hearing device 100. Moreover, fibers 110 may transfer mechanical forces without experiencing mechanical failure because of the relatively high tensile modulus of elasticity of fibers 110.

In some examples, fibers 110 may be configured to fold into compartment 300 (FIG. 3) between blunt feature 114 and a wall of the recess of the housing component. In this way, fibers 110 may distribute at least some of the mechanical forces applied by an external force (e.g., a user of hearing device 100) across the larger surface areas, such as the surface area of the wall of the recess of the housing component.

In some examples, hearing device 100 may include compression element 500 configured to secure blunt feature 114 to the housing component, such as one of faceplate 102 or shell 104. Compression element 500 may define opening 504 to a passage for insertion of conductor 106. Opening 504 may be sufficiently narrow that, after insertion of conductor 106, friction resists removal of conductor 106 within opening 504. In some examples, the dimensions of opening 504 may be changed (e.g., increased in size, decreased in size, etc.) to facilitate insertion of fibers 110, to facilitate removal of fibers 110, to secure fibers 110 (e.g., to resist linear and/or rotational motion of fibers 110), and/or the like. In some examples, compression element 500 may also compress fibers 110 against the housing component.

Figure 7:
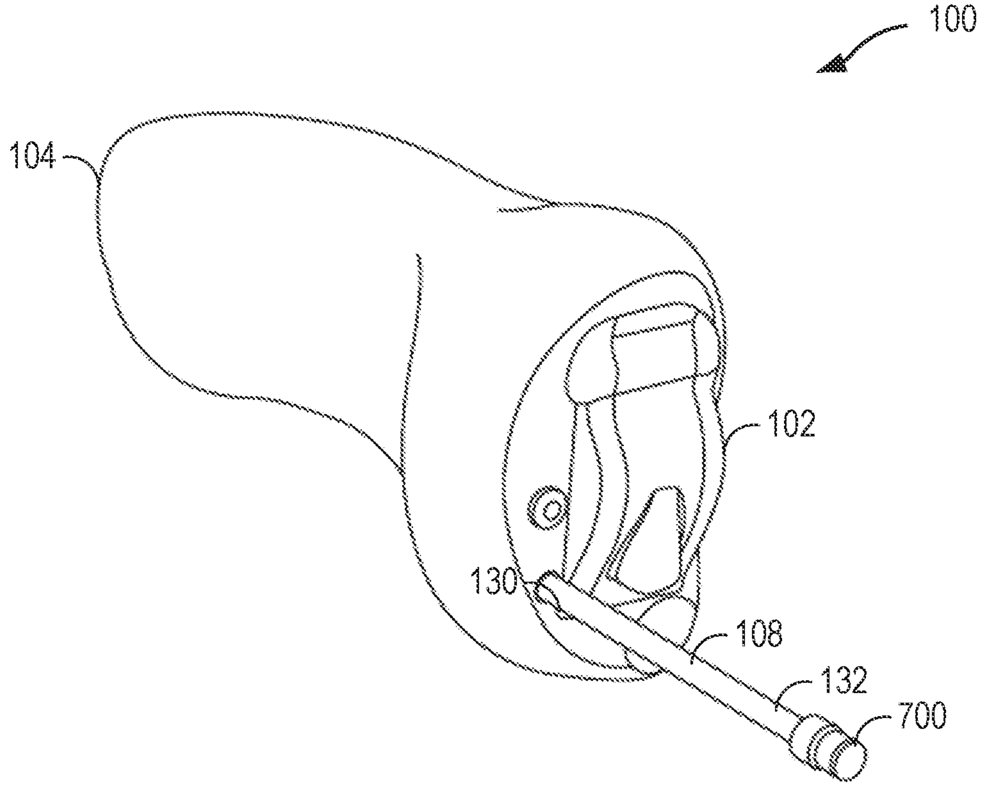
FIG. 7 is a conceptual diagram illustrating an example hearing instrument having a multi-function cable that includes an electronic component, in accordance with one or more aspects of this disclosure.

FIG. 7 is a conceptual diagram illustrating an example hearing device 100 having a multi-function cable 108 that includes an electronic component 700, in accordance with one or more aspects of this disclosure. As shown in FIG. 7, multi-function cable 108 may include a first portion 130 and a second portion 132. In some examples, first portion 130 may extend through a passage of a housing component. In the example of FIG. 7, first portion 130 extends through a passage of faceplate 102. In other examples where multi-function cable 108 extends through a passage of shell 104, first portion 130 may extend through the passage of shell 104. First portion 130 may include a first (inner) end of multi-function cable 108. The first end may include blunt feature 114. Although multi-function cable 108 is shown as being straight in FIG. 7 and elsewhere in this disclosure, multi-function cable 108 may be curved in some examples. For instance, one or more wires in multi-function cable 108 may be heat-treated to form a curved shape, e.g., to better match the curvature of a user's ear.

Second portion 132 may be free such that a user of hearing device 100 may grasp second portion 132 to use one or more functions of multi-function cable 108. Second portion 132 may include a second (outer) end of multi-function cable 108. In some examples, the second end may include an electronic component 700. In other examples, electronic component 700 is situated between the first end and the second end, or at the first end. For example, electronic component 700 may be a switch, a sensor, and/or the like. Example types of switches include capitative switches, mechanical switches, pressure-based switches, optical switches, and so on. Example sensors may include pressure sensors, light sensors, humidity sensors, heat sensors, and so on. Conductor 106 may conduct signals generated by electronic component 700 to internal components of hearing device 100 and/or may conduct power to electronic component 700. In examples where electronic component 700 includes a switch, electronic component 700 being located on second portion 130 of multi-function cable 108 may enable a user to more easily control hearing device 100, improving the user experience. In some examples, conductor 106 is an optical conductor (e.g., a light pipe) that guide light and electronic component 700 is an optical switch. For instance, in such examples, electronic component 700 may include a light source and a light detector. The light source may be a light emitting diode (LED) or other type of light emitting device. Electronic component 700 may be positioned at an internal end of conductor 106 (e.g., within a shell 104 of hearing device 100). The light source of electronic component 700 may produce light that the optical conductor guides to an outer end of the optical conductor. In such examples, the light detector of electronic component 700 may detect reflections of the light produced by the light source propagating back through the optical conductor from the outer end of the optical conductor. These reflections may occur when, e.g., a user places a finger over the outer end of the optical conductor. The optical switch may generate a signal or perform another action in response to detecting the reflections. Thus, electronic component 700 may be configured to act as a switch that the user can control by placing a finger at the outer end of the optical conductor. Thus, the hearing device 100 of FIG. 7 may comprise a housing component (e.g., faceplate 102 or shell 104); a multi-function cable 108 having an outer jacket 112 that extends through the housing component; and an electronic component 700 connected to multi-function cable 108.

Various aspects of the techniques may enable the following examples.

Example 1: A hearing device configured to be worn in an ear of a wearer, the hearing device comprising: a first housing component; a second housing component configured to attach to the first housing component to define an enclosure for containing a plurality of hearing device components; a conductor; a multi-function cable comprising: a blunt feature, and an outer jacket of a multi-function cable, wherein: the outer jacket of the multi-function cable extends through the first housing component; a passage is defined by the blunt feature and the outer jacket; the conductor extends through the passage; and the blunt feature is integrated into the outer jacket and is configured to mechanically interface with a recess defined by the first housing component to prevent rotation of the blunt feature within the recess; and a plurality of fibers, secured to an inner surface of the passage and an inner surface of the enclosure, wherein: the plurality of fibers extends through the passage defined by the blunt feature and the outer jacket of the multi-function cable; and the plurality of fibers is configured to transfer mechanical forces from the multi-function cable to the first housing component.

Example 2: The hearing device of example 1, wherein the plurality of fibers is splayed across a surface of the first housing component to increase a contact area between the plurality of fibers and the surface of the first housing component.

Example 3: The hearing device of any of examples 1-2, wherein the plurality of fibers is configured to fold into a compartment between the blunt feature and a wall of the recess of the first housing component.

Example 4: The hearing device of any of examples 1-3, wherein the first housing component defines a compartment configured to receive a set of fibers of the plurality of fibers and secure the set of fibers therein.

Example 5: The hearing device of any of examples 1-4, wherein the plurality of fibers is comprised of a material with a tensile modulus of elasticity of about 65 to 115 gigapascals (GPa).

Example 6: The hearing device of any of examples 1-5, wherein the plurality of fibers is comprised of Aramid fibers.

Example 7: The hearing device of any of examples 1-6, wherein the outer jacket is comprised of a thermoplastic elastomer.

Example 8: The hearing device of any of examples 1-7, wherein the blunt feature is at least in partly secured to the recess of the first housing component by using at least one of an adhesive or fastener.

Example 9: The hearing device of any of examples 1-8, wherein a face of the blunt feature is substantially polygonal.

Example 10: The hearing device of any of examples 1-9, wherein the conductor is an antenna.

Example 11: The hearing device of any of examples 1-9, wherein the hearing device further comprises an electronic component connected to the multi-function cable and the conductor conducts signals from the electronic component or conducts power to the electronic component.

Example 12: The hearing device of example 11, wherein the electronic component is at least one of a sensor or a switch.

Example 13: The hearing device of any of examples 1-12, wherein the first housing component is a faceplate of the hearing device.

Example 14: The hearing device of any of examples 1-12, wherein the first housing component is a shell of the hearing device.

Example 15: The hearing device of any of examples 1-14, wherein the hearing device further comprises a compression element configured to secure the blunt feature by compressing the blunt feature into the first housing component.

Example 16: The hearing device of any of examples 1-15, wherein the first housing component has one or more structures that protrude from an inner surface of the first housing component, the one or more structures at least partially defining the recess, and the blunt feature abutting the one or more structures.

Example 17: The hearing device of any of examples 1-15, wherein the recess is sunken into an inner surface of the first housing component.

Example 18: A method of assembling a hearing device configured to be worn in an ear of a wearer, the method comprising: extending a conductor through a passage defined by a blunt feature and an outer jacket of a multi-function cable; inserting a blunt feature, integrated into the outer jacket, into a recess on a housing component of the hearing device, wherein the blunt feature is configured to mechanically interface with the recess of the housing component to prevent rotation of the blunt feature within the recess; extending a plurality of fibers through the passage; and securing the plurality of fibers to an inner surface of the passage, wherein the plurality of fibers is configured to transfer mechanical forces from the multi-function cable to the plurality of fibers.

Example 19: The method of example 18, wherein the plurality of fibers is splayed across a surface of the housing component to increase a contact area between the plurality of fibers and the surface of the housing component.

Example 20: The method of any of examples 18-19, wherein the plurality of fibers is configured to fold into a compartment between the blunt feature and a wall of the housing component.

Example 21: The method of any of examples 18-20, wherein the plurality of fibers is comprised of a material with a tensile modulus of elasticity of about 65 to 115 gigapascals (GPa).

Example 22: The method of any of examples 18-21, wherein the plurality of fibers is comprised of Aramid fibers.

Example 23: The method of any of examples 18-22, wherein the blunt feature is at least in part secured to the recess of the housing component by using one or more of an adhesive or fastener.

Example 24: The method of any of examples 18-23, wherein a face of the blunt feature is substantially polygonal.

Example 25: The method of any of examples 18-24, wherein the conductor is an antenna.

Example 26: The method of any of examples 18-24, wherein the hearing device further comprises an electronic component connected to the multi-function cable and the conductor conducts signals from the electronic component or conducts power to the electronic component.

Example 27: The method of any of examples 18-26, wherein the electronic component is at least one of a sensor or a switch.

Example 28: The method of any of examples 18-27, wherein the housing component is a faceplate of the hearing device.

Example 29: The method of any of examples 18-28, wherein the housing component is a shell of the hearing device.

Example 30: The method of any of examples 18-29, wherein the hearing device further comprises a compression element configured to secure the blunt feature by compressing the blunt feature into the housing component.

Example 31: The method of any of examples 18-30, wherein the first housing component has one or more structures that protrude from an inner surface of the first housing component, the one or more structures at least partially defining the recess, and the blunt feature abutting the one or more structures.

Example 32: The method of any of examples 18-30, wherein the recess is sunken into an inner surface of the first housing component.

Example 33: A hearing device configured to be worn in an ear of a wearer, the hearing device comprising: a housing component; a multi-function cable having an outer jacket that extends through the housing component; and an electronic component connected to the multi-function cable.

Example 34: The hearing device of example 33, wherein the hearing device is configured according to any of examples 1-17.

Example 35: A method of assembling the hearing instrument of any of examples 33-34.

It is to be recognized that depending on the example, certain acts or events of any of the techniques described herein can be performed in a different sequence, may be added, merged, or left out altogether (e.g., not all described acts or events are necessary for the practice of the techniques).

What is claimed is:

1. A hearing device configured to be worn in an ear of a wearer, the hearing device comprising:

a first housing component;

a second housing component configured to attach to the first housing component to define an enclosure for containing a plurality of hearing device components;

a conductor;

a multi-function cable comprising:

a blunt feature, and an outer jacket of the multi-function cable, wherein:

the outer jacket of the multi-function cable extends through the first housing component;

a passage is defined by the blunt feature and the outer jacket;

the conductor extends through the passage; and the blunt feature is integrated into the outer jacket and is configured to mechanically interface with a recess defined by the first housing component to prevent any rotation of the blunt feature within the recess; and a plurality of fibers, secured to an inner surface of the passage and an inner surface of the enclosure, wherein:

the plurality of fibers extends through the passage defined by the blunt feature and the outer jacket of the multi-function cable;

the plurality of fibers is configured to transfer mechanical forces from the multi-function cable to the first housing component, and the plurality of fibers is configured to fold into a compartment between the blunt feature and a wall of the recess of the first housing component.

2. The hearing device of claim 1, wherein the plurality of fibers is comprised of a material with a tensile modulus of elasticity of about 65 to 115 gigapascals (GPa).

3. The hearing device of claim 1, wherein the plurality of fibers is comprised of Aramid fibers.

4. The hearing device of claim 1, wherein the outer jacket is comprised of a thermoplastic elastomer.

5. The hearing device of claim 1, wherein the blunt feature is at least in part secured to the recess of the first housing component by using at least one of an adhesive or fastener.

6. The hearing device of claim 1, wherein a face of the blunt feature is substantially polygonal.

7. The hearing device of claim 1, wherein the conductor is an antenna.

8. The hearing device of claim 1, wherein the hearing device further comprises an electronic component connected to the multi-function cable and the conductor conducts signals from the electronic component or conducts power to the electronic component.

9. The hearing device of claim 8, wherein the electronic component is at least one of a sensor or a switch.

10. The hearing device of claim 1, wherein the first housing component is a faceplate of the hearing device.

11. The hearing device of claim 1, wherein the first housing component is a shell of the hearing device.

12. The hearing device of claim 1, wherein the hearing device further comprises a compression element configured to secure the blunt feature by compressing the blunt feature into the first housing component.

13. The hearing device of claim 1, wherein the first housing component has one or more structures that protrude from an inner surface of the first housing component, the one or more structures at least partially defining the recess, and the blunt feature abutting the one or more structures.

14. The hearing device of claim 1, wherein the recess is sunken into an inner surface of the first housing component.

15. A method of assembling a hearing device configured to be worn in an ear of a wearer, the method comprising:

extending a conductor through a passage defined by a blunt feature and an outer jacket of a multi-function cable;

inserting the blunt feature, integrated into the outer jacket, into a recess on a housing component of the hearing device, wherein the blunt feature is configured to mechanically interface with the recess of the housing component to prevent any rotation of the blunt feature within the recess;

extending a plurality of fibers through the passage; and securing the plurality of fibers to an inner surface of the passage, wherein the plurality of fibers is configured to transfer mechanical forces from the multi-function cable to the plurality of fibers and the plurality of fibers is configured to fold into a compartment between the blunt feature and a wall of the housing component.

* * * * *